United States Patent
Sunaga et al.

(10) Patent No.: US 8,184,738 B2
(45) Date of Patent: May 22, 2012

(54) CLOCK REPRODUCING APPARATUS AND METHOD

(75) Inventors: Kazuhisa Sunaga, Tokyo (JP); Kouichi Yamaguchi, Tokyo (JP); Muneo Fukaishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 12/088,358

(22) PCT Filed: Sep. 28, 2006

(86) PCT No.: PCT/JP2006/319276
§ 371 (c)(1),
(2), (4) Date: Mar. 27, 2008

(87) PCT Pub. No.: WO2007/037312
PCT Pub. Date: Apr. 5, 2007

(65) Prior Publication Data
US 2010/0150289 A1   Jun. 17, 2010

(30) Foreign Application Priority Data
Sep. 28, 2005   (JP) .................. 2005-282352

(51) Int. Cl.
    *H04L 7/00*   (2006.01)
(52) U.S. Cl. ...................... 375/291; 375/355
(58) Field of Classification Search ............ 375/291, 375/290, 340, 355, 354, 317, 371, 374, 375; 714/705, 819
See application file for complete search history.

(56) References Cited

U.S. PATENT DOCUMENTS

| | | | | |
|---|---|---|---|---|
| 3,864,529 A | * | 2/1975 | Tracey et al. | 375/293 |
| 3,906,174 A | * | 9/1975 | Dotter, Jr. | 714/715 |
| 4,707,730 A | * | 11/1987 | Alard | 348/525 |
| 6,377,642 B1 | * | 4/2002 | Dollard | 375/355 |
| 2003/0169835 A1 | * | 9/2003 | Takatori et al. | 375/371 |
| 2005/0002475 A1 | * | 1/2005 | Menolfi et al. | 375/340 |
| 2005/0024253 A1 | * | 2/2005 | Adamiecki et al. | 341/169 |
| 2005/0058234 A1 | * | 3/2005 | Stojanovic | 375/371 |
| 2005/0123068 A1 | * | 6/2005 | Liu et al. | 375/316 |
| 2008/0112522 A1 | * | 5/2008 | Fukuda et al. | 375/371 |
| 2008/0137790 A1 | * | 6/2008 | Cranford et al. | 375/357 |

FOREIGN PATENT DOCUMENTS

| | | |
|---|---|---|
| JP | 64060132 | 3/1989 |
| JP | 03062753 | 3/1991 |
| JP | 04229750 | 8/1992 |
| JP | 06176498 | 6/1994 |
| JP | 06177771 | 6/1994 |
| JP | 10004436 | 1/1998 |
| JP | 2002314345 | 10/2002 |

* cited by examiner

*Primary Examiner* — Aristocratis Fotakis
(74) *Attorney, Agent, or Firm* — Sughrue Mion, PLLC

(57) ABSTRACT

A common mode of a waveform of a duobinary transmission signal (IN) is set to 0 and the size of a data eye is set to Veye; and reference potentials Vref_H and Vref_L are set to the following values:

$$Veye/\sqrt{3} \leq Vref\_H \leq Veye/\sqrt{2} \qquad (1)$$

$$-Veye/\sqrt{2} \leq Vref\_L \leq -Veye/\sqrt{3} \qquad (2)$$

More particularly, effect becomes remarkable by setting the reference potentials Vref_H and Vref_L to central values in ranges shown in Equations (1) and (2), respectively. In the central values, fluctuation (jitter) of transition data becomes the smallest, and a jitter characteristic of a reproducing clock becomes the best. Consequently, a clock reproducing apparatus in which a received clock from duobinary transmission data is reproduced with high accuracy is provide.

12 Claims, 9 Drawing Sheets

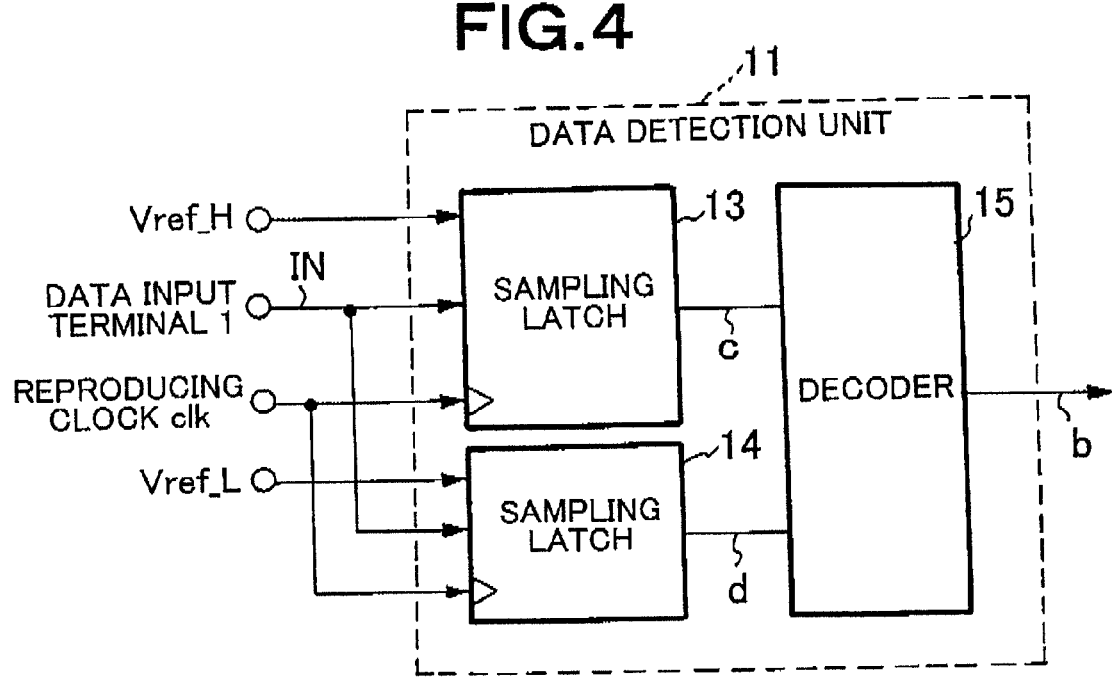
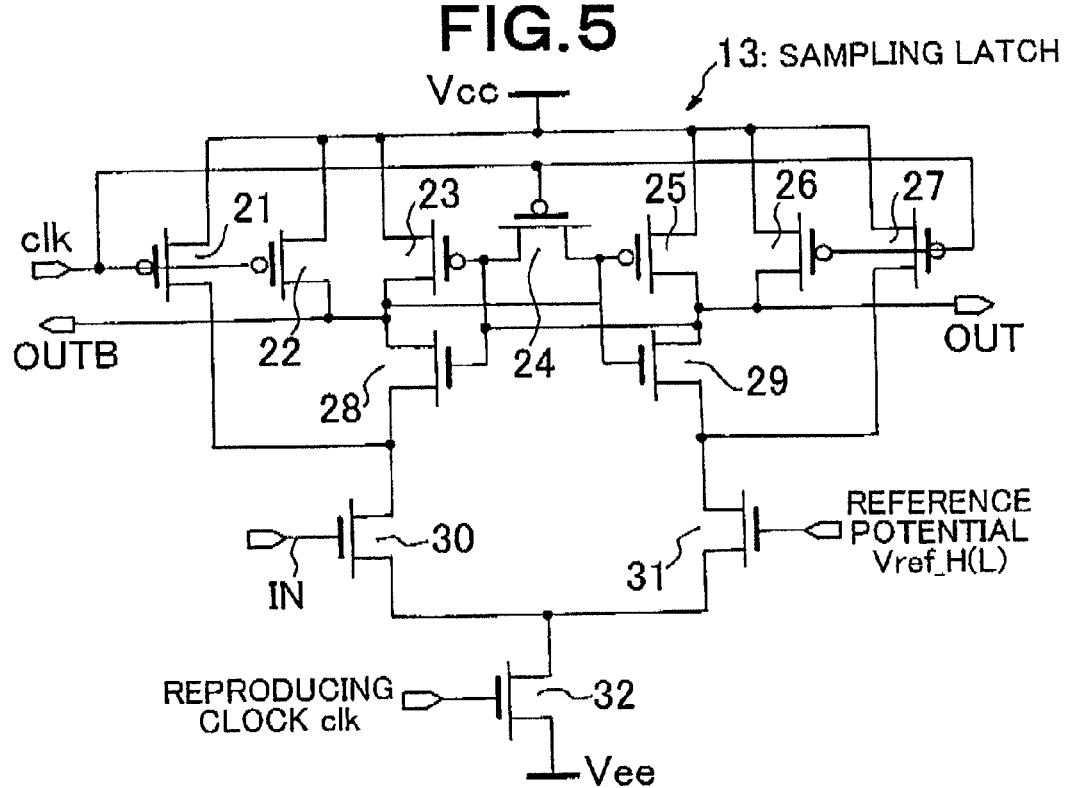

12: PHASE COMPARISON UNIT

CLOCK REPRODUCING APPARATUS AND METHOD

TECHNICAL FIELD

The present invention relates to a clock reproducing apparatus and a method, both of which are suitable for use in the case where a received clock from duobinary transmission-received data is reproduced with high accuracy.

BACKGROUND ART

In recent years, various high-speed serial communication technologies have been developing with an increase in communication speed of data communication. In high-speed serial communication in which baseband transmission is the mainstream, a waveform of a data transmission signal deteriorates in proportion to a frequency of the data transmission signal due to skin effect and dielectric loss in a transmission path. For this reason, there is a disadvantage in that deterioration of the waveform exerts on neighboring bits and subsequent bits; and consequently, data communication is not correctly performed. Such interference to other communication codes is called as intersymbol interference, and there is reported a waveform equalizing technique which solves such intersymbol interference. That is, as one of transmission systems for correcting the intersymbol interference in baseband transmission, there is a partial response (hereinafter referred to as PR) system that is a system for equalizing a code so as to discretely take an amount of the intersymbol interference. In duobinary transmission that is one of the PR system, successive two pulses discretely having one symbol time interval are combined and transmitted.

As shown in FIG. 1, combined signal waves have regions A, B, C, D, and the like in data eye openings; signal formats with three data levels at the receiving end; and complicated data transition different from pulse amplitude modulation (referred to as PAM) transmission such as binary and quaternary transmission. A clock of the received data needs to be correctly reproduced from such complicated transition data.

Conventionally, as for this kind of technology, there is one disclosed in the following document, for example. In a digital signal reproducing apparatus disclosed in Patent Document 1, a sampling clock of an A/D converter circuit is sampled (oversampled) by a clock having a cycle four times as long as the data cycle. In the case where electric potentials of neighboring sampling data having the same codes are different, in order to show that the sampling clock is not sampled at the center of a data waveform, analog values sampled by the A/D converter circuit are matched, and accordingly, a phase of a reproducing clock is adjusted at an optimum position. However, in high-speed serial communication, amplitude attenuation in a data transmission path is very large, and therefore, it is very difficult to detect an analog potential of received data with high accuracy by the A/D converter circuit. Furthermore, in the same reproducing apparatus, in order to take a time for adjusting the clock, data transmission in which a phase adjustment signal header is applied to data is performed. During this time, since data to be fundamentally communicated cannot be communicated, there is a problem in that effective communication speed is reduced. In order not to reduce communication speed, the clock is required to be reproduced from communicating data itself.

[Patent Document 1] Japanese Patent Laying-Open No. 06-176498 (Abstract, FIG. 1, FIG. 2, and FIG. 4)

DISCLOSURE OF THE INVENTION

Problems to be Solved by the Invention

However, the above conventional reproducing apparatus has presented the following problem. That is, in the case where oversampling of the data is performed with high accuracy by the A/D converter circuit, the number of quantized bits of the same A/D converter circuit needs to be increased; however, generally in the A/D converter circuit, it is difficult to realize high accuracy and an increase in sampling rate at the same time. The reason is that, in serial communication in recent years, data communication speed is very high as compared with low speed data communication such as magnetic record, and therefore, there is no timing margin to perform A/D conversion of a high order bit. Furthermore, in long distance transmission and high-speed communication transmission, when attenuation in data amplitude is very large, an analog value in which the A/D converter circuit has to sample is very small; and therefore, it is very difficult to increase accuracy. In addition, in such reproducing apparatus, exclusive data for adjusting a reproducing clock for two cycles is used as a header, and therefore, there is a problem in that effective data transmission speed is reduced.

The present invention has been made in view of the above circumstances, and it is an object of the present invention to provide a clock reproducing apparatus which can be used for high-speed serial communication without deteriorating effective data communication speed.

Means for Solving Problem

In order to solve the above problem, according to the present invention, there is provided a clock reproducing apparatus which reproduces a clock from a duobinary transmission signal, wherein data of the duobinary transmission signal has a maximum data level, a minimum data level, and an intermediate data level, and the clock reproducing apparatus is configured to reproduce the clock using at least one of transition from the maximum data level to the intermediate data level, transition from the minimum data level to the intermediate data level, transition from the intermediate data level to the maximum data level, and transition from the intermediate data level to the minimum data level, as boundary data between neighboring data.

Further, the size of a data eye of the duobinary transmission signal is Veye; and reference potentials Vref_H and Vref_L are set to $Veye/\sqrt{3} \leq Vref\_H \leq Veye/\sqrt{2}$ and $-Veye/\sqrt{2} \leq Vref\_L \leq -Veye/\sqrt{3}$, respectively.

Effects of the Invention

According to the present invention, at least one of the transition from the maximum data level to the intermediate data level, the transition from the minimum data level to the intermediate data level, the transition from the intermediate data level to the maximum data level, and the transition from the intermediate data level to the minimum data level of the data of the duobinary transmission signal is used as the boundary data between neighboring data; whereby a reproducing clock with a good jitter characteristic can be obtained.

BRIEF DESCRIPTION OF THE DRAWINGS

FIG. 4 is a block diagram showing an electrical configuration of a data detection unit 11 shown in FIG. 3;

FIG. 5 is a circuit diagram showing one example of an electrical configuration of sampling latches 13 and 14 shown in FIG. 4;

DESCRIPTION OF REFERENCE NUMERALS

2 Phase detection circuit
3 Low pass filter (LPF)
4 Phase adjustment circuit
5 Phase-locked loop (PLL)
11 Data detection unit
12 Phase comparison unit
13 and 14 Sampling latches (part of data detection unit)
15 Decoder (part of data detection unit)
21, 22, 23, 24, 25, 26, and 27 p-channel type MOSFETs (pMOSs, part of sampling latch)
28, 29, 30, 31, and 32 n-channel type MOSFETs (nMOSs, part of sampling latch)
12a and 12b Exclusive OR (ExOR) circuits (part of phase comparison unit)
clk Reproducing clock

BEST MODE FOR CARRYING OUT THE INVENTION

Figure 1:
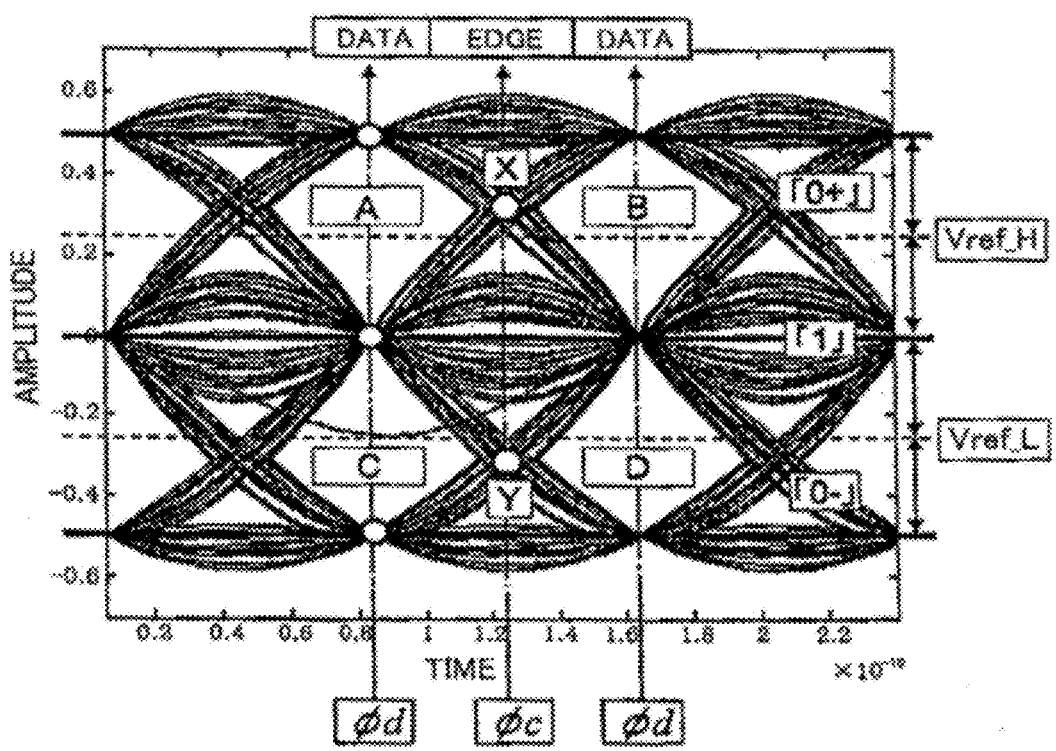
FIG. 1 is a diagram showing a pattern of a duobinary transmission signal (IN)
Figure 2:
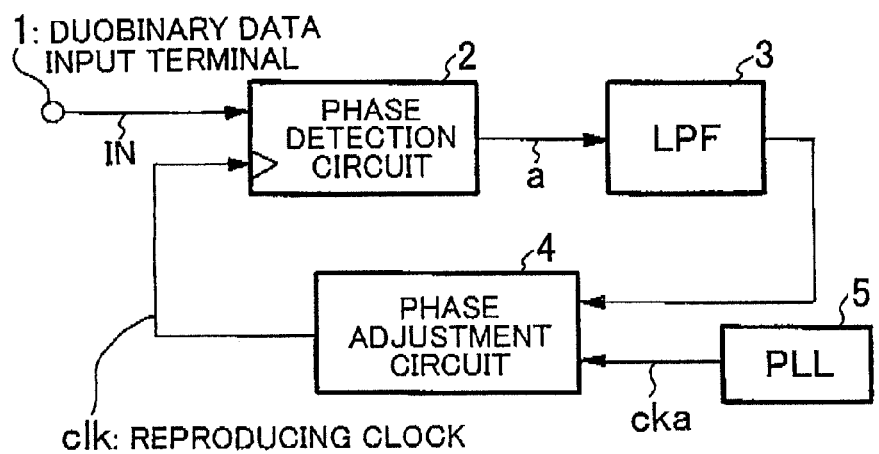
FIG. 2 is a block diagram showing an electrical configuration of a clock reproducing apparatus that is one embodiment of the present invention.

FIG. 2 is a block diagram showing an electrical configuration of a clock reproducing apparatus that is an embodiment of the present invention. As shown in the same drawing, the clock reproducing apparatus of this sample is composed of an input terminal 1, a phase detection circuit 2, a low pass filter (hereinafter referred to as LPF) 3, a phase adjustment circuit 4, and a phase-locked loop (hereinafter referred to as PLL) 5. The input terminal 1 inputs a duobinary transmission signal (IN) whose waveform is equalized by a transmitter circuit (not shown in the drawing) or the like. The phase detection circuit 2 detects data transition from the inputted duobinary transmission signal (IN) on the basis of a determination result of data and an edge timing shown in FIG. 1, and outputs an up/down signal (a) that is a signal (up) for advancing or a signal (down) for delaying a phase of a reproducing clock clk. The LPF 3 eliminates error due to noise by averaging the output signal (a) of the phase detection circuit 2. The PLL 5 generates a reference clock cka. The phase adjustment circuit 4 adjusts a phase of the reference clock cka which is supplied from the PLL 5 on the basis of the up/down signal (a) obtained from the LPF 3 and outputs the adjusted reference clock as the reproducing clock clk.

Figure 3:
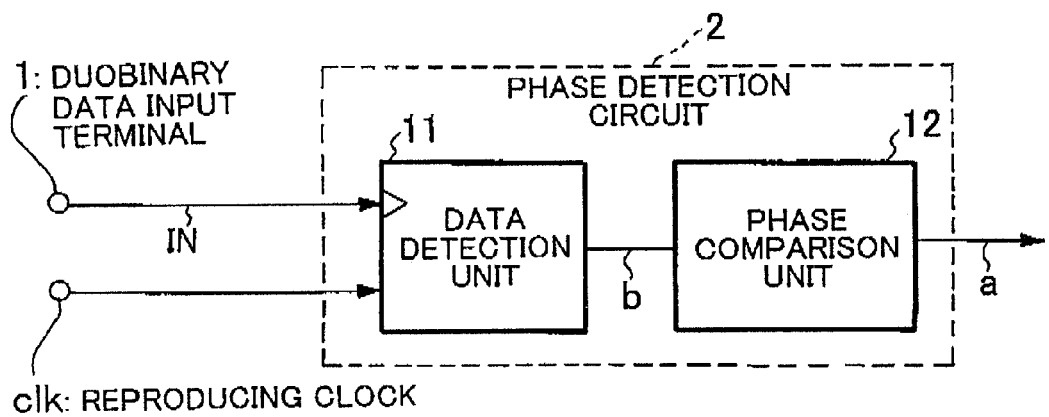
FIG. 3 is a block diagram showing an electrical configuration of a phase detection circuit 2 shown in FIG. 2.

FIG. 3 is a block diagram showing an electrical configuration of the phase detection circuit 2 shown in FIG. 2. The phase detection circuit 2 is composed of a data detection unit 11 and a phase comparison unit 12 as shown in FIG. 3. The duobinary transmission signal (IN) and the reproducing clock clk are input to the data detection unit 11, and the data detection unit 11 outputs a determining signal (b) indicating a determination result of the data to the phase comparison unit 12. The phase comparison unit 12 detects data transition of the duobinary transmission signal (IN) on the basis of the determining signal (b), and outputs the up/down signal (a) indicating the signal (up) for advancing or the signal (down) for delaying the phase of the present reproducing clock clk by a phase shifting between the duobinary transmission data and the reproducing clock clk.

FIG. 4 is a block diagram showing an electrical configuration of the data detection unit 11 shown in FIG. 3. The data detection unit 11 circuit is composed of sampling latches 13 and 14 and a decoder 15 as shown in FIG. 4. The sampling latch 13 determines magnitude correlation between an inputted reference potential Vref_H and a potential of the duobinary transmission signal (IN), and outputs a determination signal (c). The sampling latch 14 determines magnitude correlation between an inputted reference potential Vref_L and the potential of the duobinary transmission signal (IN), and outputs a determination signal (d). In this case, the reference potential Vref_H is a reference potential (first reference potential) which is for dividing regions A and B shown in FIG. 1 into two parts and discriminating data "0+" (maximum data level) and data "1" (intermediate data level), and the reference potential Vref_L is a reference potential (second reference potential) which is for dividing regions C and D into two parts and discriminating data "0−" (minimum data level) and the data "1" (intermediate data level). The decoder 15 determines received data on the basis of the determination signal (c) and the determination signal (d), and outputs the determining signal (b) indicating a determination result ("1" or "0") of the received data.

FIG. 5 is a circuit diagram showing one example of an electrical configuration of the sampling latches 13 and 14 shown in FIG. 4. As shown in FIG. 5, the sampling latch 13 is composed of p-channel type MOSFETs (hereinafter referred to as pMOS) 21, 22, 23, 24, 25, 26, and 27; and n-channel type MOSFETs (hereinafter referred to as nMOS) 28, 29, 30, 31, and 32. The sampling latches 13 and 14 determine minute magnitude correlation between the duobinary transmission signal (IN) and the reference potentials Vref_H and Vref_L when the reproducing clock clk is inputted. That is, when the reproducing clock clk is at a low level ("L," substantially a level of power supply potential Vee), the nMOS 32 is in OFF state and the pMOSs 21, 22, 26, and 27 are in ON state; and accordingly, terminals OUT and OUT (B) and nodes X and Y are precharged to a level of a power supply potential Vcc. That is, it becomes states of V(X)=V(Y)=H and V(OUT)=V(OUTB)=H.

In this precharged state, when there is a difference between data pair ((duobinary transmission signal (IN))/(reference potential Vref_H or Vref_L)), and if the reproducing clock clk is at a high level ("H," substantially the level of power supply potential Vcc), there generates a difference in lowering of potentials at the nodes X and Y. Then, a latch composed of the pMOSs 24 and 25 and nMOSs 28 and 29 finally increases the difference to a state of V(OUT)=H and V(OUTB)=L, or V(OUT)=L and V(OUTB)=H. This state is latched as data by a set-reset flip-flop (hereinafter referred to as SR latch) (not shown in the drawing) at the next stage. The SR latch has a data maintain function with respect to data input of H/H; and therefore, data decided at the time when the reproducing clock clk becomes "H" is maintained also during precharging. This configures a delayed flip-flop (referred to as D-FF) which can detect minute difference with high speed.

Figure 6:
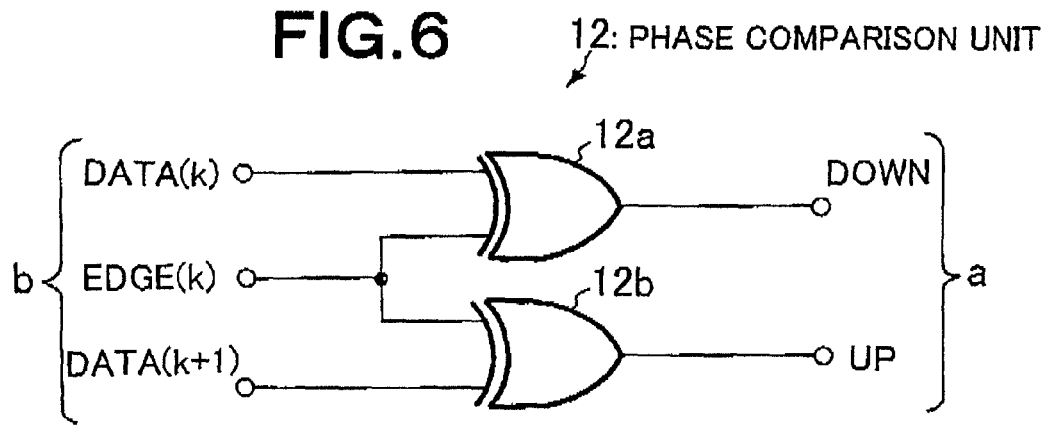
FIG. 6 is a circuit diagram showing an electrical configuration of a phase comparison unit 12 shown in FIG. 3.

FIG. 6 is a circuit diagram showing an electrical configuration of the phase comparison unit 12 shown in FIG. 3. As shown in FIG. 6, the phase comparison unit 12 is composed of exclusive OR (hereinafter referred to as ExOR) circuits 12a and 12b. Furthermore, the determining signal (b) from the data detection unit 11 is composed of data Data(k) detected by a former clock φd(k), data Data(k+1) detected by a latter clock φd(k+1), and the edge Edge(k) detected by a clock φc(k) therebetween, shown in FIG. 1. In the phase comparison unit 12, ExOR calculation of the data Data(k), the edge Edge(k), and the data Data(k+1) is made by the ExOR circuits 12a and 12b, and accordingly, data transition is detected and a phase shifting with respect to data of the reproducing clock clk is detected; and consequently, the Up/Down signal (a) that is an adjustment signal of the phase of the same reproducing clock clk is outputted. More particularly, in the phase comparison unit 12, the ExOR circuits 12a and 12b output the same data together only when the data Data(k), the edge Edge(k), and the data Data(k+1) have no data transition, which is "1"→"1" or "0"→"0." When the same data is outputted, a state where there is no data transition is eliminated by a logic circuit (not shown in the drawing) in a subsequent stage.

Figure 7:
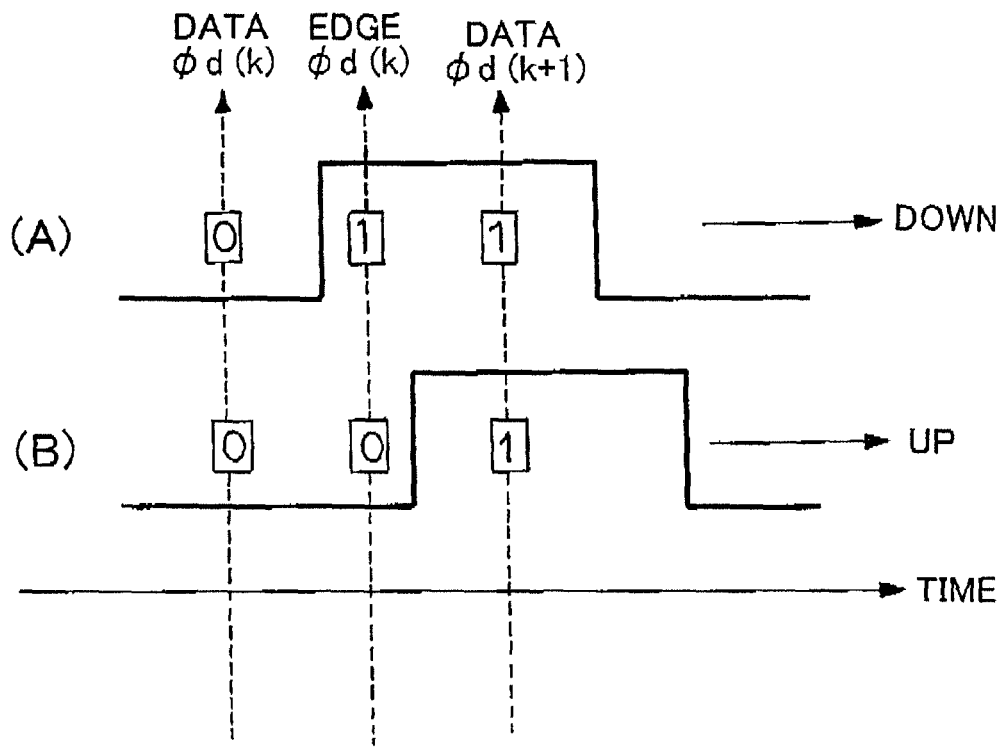
FIG. 7 is a diagram for explaining phase comparison of data and clock.
Figure 8:
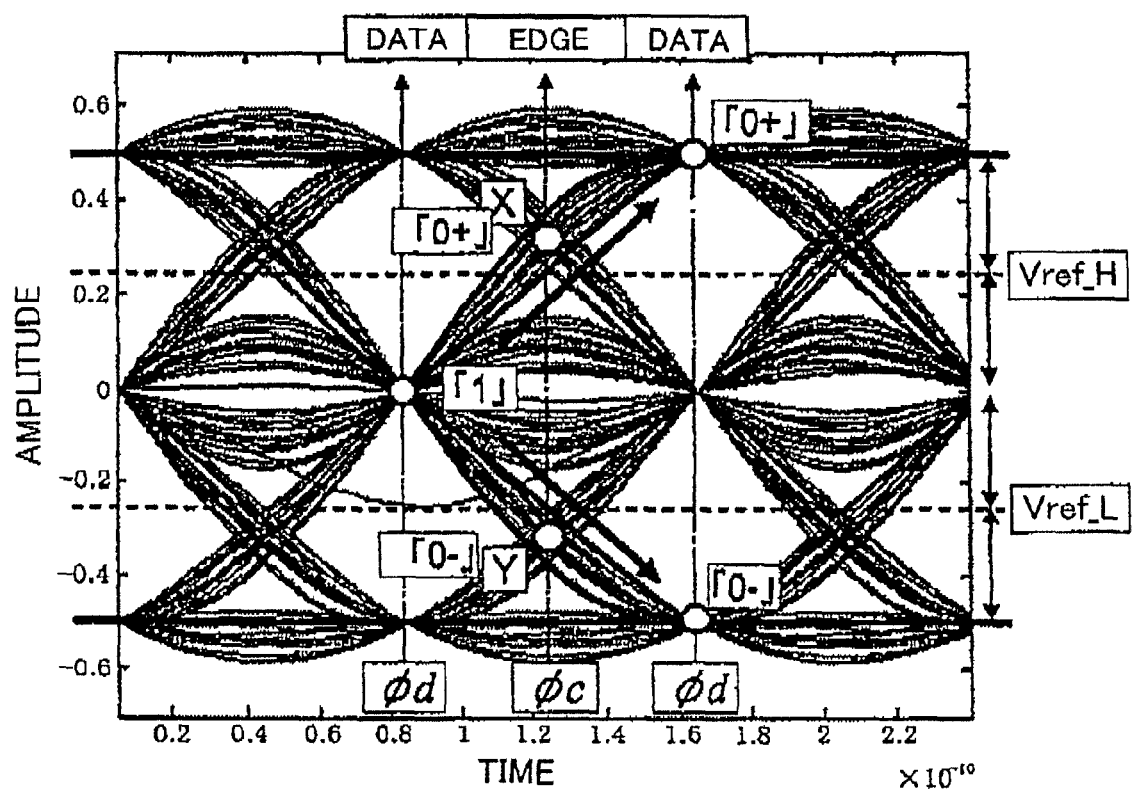
FIG. 8 is a diagram for explaining data transition used for clock adjustment.
Figure 9:
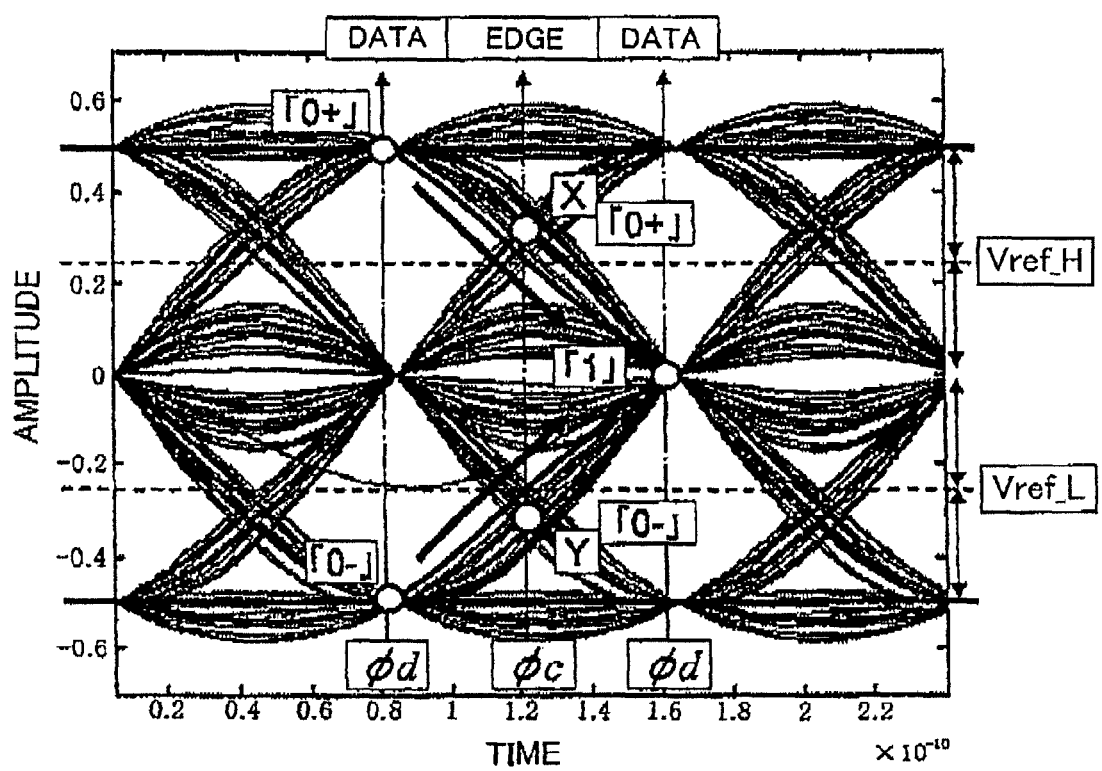
FIG. 9 is a diagram for explaining other data transition used for clock adjustment.
Figure 10:
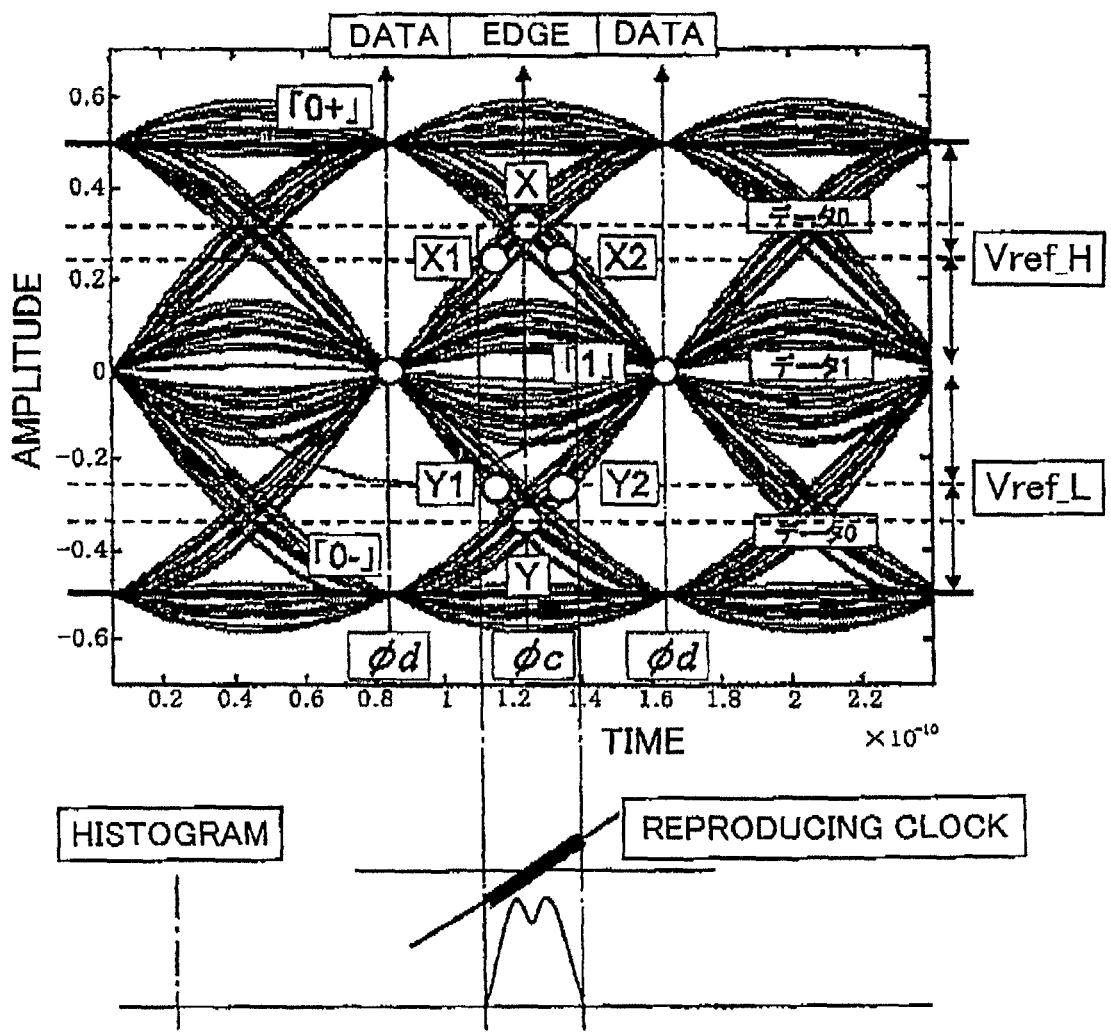
FIG. 10 is a diagram for explaining phase adjustment of a reproducing clock.
Figure 11:
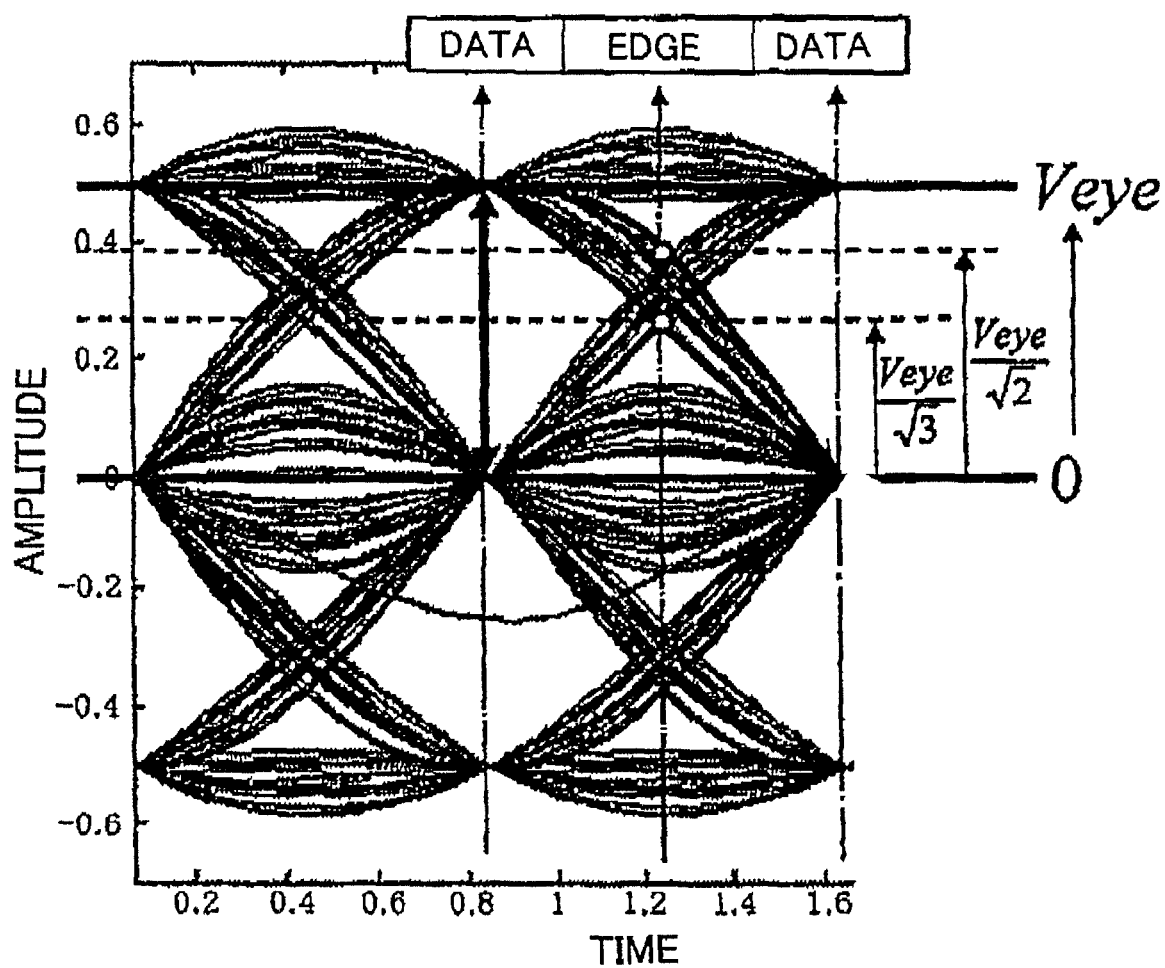
FIG. 11 is a diagram for explaining a setting range of a reference potential.

FIG. 7 is a diagram for explaining phase comparison of data and a clock, and FIG. 8 is a diagram for explaining data transition used for clock adjustment. FIG. 9 is a diagram for explaining other data transition used for clock adjustment, FIG. 10 is a diagram for explaining phase adjustment of a reproducing clock, and FIG. 11 is a diagram for explaining a setting range of a reference potential.

Referring to these drawings and FIG. 1, processing contents of a clock reproducing method used for the clock reproducing apparatus of this example will be described. In the clock reproducing apparatus, the data of the duobinary transmission signal (IN) has the maximum data level, the minimum data level, and the intermediate data level; and at least one of transition from the maximum data level to the intermediate data level, transition from the minimum data level to the intermediate data level, transition from the intermediate data level to the maximum data level, and transition from the intermediate data level to the minimum data level is used as boundary data between neighboring data, and a clock is reproduced.

That is, as shown in FIG. 1, a waveform of the duobinary transmission signal (IN) is sampled by the sampling clocks φd, φc, and φd of the phase detection circuit 2. The phase of the reproducing clock clk is determined whether or not it is advanced or delayed with respect to the data of the duobinary transmission signal (IN) by using the determination result. As shown in FIG. 7, in the case where data sampled by the sampling clock φd (center of data eye) are "0" and "1"; when the edge data that is the intermediate data is "1," it is judged that the reproducing clock clk is advanced with respect to the data of the duobinary transmission signal (IN) by the phase detection circuit 2; and on the contrary, when the intermediate data is "0," it is judged that the reproducing clock clk is delayed with respect to the data of the duobinary transmission signal (IN). This determination result is outputted from the phase detection circuit 2 as the up/down signal (a) of the clock phase.

In this embodiment, points X and Y shown in FIG. 1 are used at the edges to be sampled by the sampling clock φc. That is, only data transitions shown in FIGS. 8 and 9 are used. However, in order to determine "1" and "0" of the edge data by the transitions passing the points X and Y of waveforms of the data of the duobinary transmission signal (IN) shown in FIGS. 8 and 9, two reference potentials Vref_H and Vref_L for determining the level are required. Generally, positions of the reference potentials Vref_H and Vref_L shown in FIG. 1 are set to a central value of a potential direction of the data eye; however, in the case where the points X and Y that are the data edges, the following problem is generated in clock reproduction at the potentials of the same reference potentials Vref_H and Vref_L. That is, in the case where the reference potentials Vref_H and Vref_L are set to the central value of the data eye and the sampling clock φd is set to the central value of the data eye, as shown in FIGS. 8 and 9, sampling data of the points X and Y at the sampling clock φc is always determined as "0."

Therefore, in the case of the transition passing the point X shown in FIG. 8, it becomes data=1, edge=0, and data=0; and a down signal is outputted from the phase detection circuit 2. As a result, in the transition shown in FIG. 8, the sampling clock φc is adjusted to points X1 and Y1 shown in FIG. 10; and in the transition shown in FIG. 9, the sampling clock φc is adjusted to points X2 and Y2 shown in FIG. 10. Therefore, in spite that the sampling clock φd samples the center of the data eye, the phase of the reproducing clock clk is adjusted to a value having a width as shown in a histogram of FIG. 10; and therefore, there is a problem in that a jitter of the same reproducing clock clk becomes large.

Consequently, in order to solve the above problem, in this embodiment, the reference potentials Vref_H and Vref_L are set to the following values to reduce the jitter: that is, as shown in FIG. 11, a common mode (intermediate potential) of the waveform of the duobinary transmission signal (IN) is set to 0, and the size of the data eye is set to Veye:

$$Veye/\sqrt{3} \leq Vref\_H \leq Veye/\sqrt{2} \tag{1}$$

$$-Veye/\sqrt{2} \leq Vref\_L \leq -Veye/\sqrt{3} \tag{2}$$

More particularly, effect becomes remarkable by setting the reference potentials Vref_H and Vref_L to central values in ranges shown in Equations (1) and (2), respectively. In the central values, the fluctuation (jitter) of the transition data becomes the smallest, and a jitter characteristic of the reproducing clock clk becomes the best.

Generally, in order to realize the duobinary transmission, a waveform is equalized by minimum mean square method. At that time, an amplitude value of the data eye (potential difference between "0+" data and "0−" data at the timing φd) is also optimized at the same time, and therefore, the amplitude value is used as the value of Veye of the above Equations (1) and (2). Furthermore, it is not limited to this method; for example, there may be used a method in which a peak detection circuit is mounted in a receiver circuit and the value of Veye is detected using the peak detection circuit, as long as the circuit detects the amplitude value of the data eye.

As described above, in this embodiment, at least one of the transition from the maximum data level to the intermediate data level, the transition from the minimum data level to the intermediate data level, the transition from the intermediate data level to the maximum data level, and the transition from the intermediate data level to the minimum data level of the data of the duobinary transmission signal (IN) is used as the boundary data between neighboring data, and therefore, a reproducing clock clk with a good jitter characteristic can be obtained.

Figure 12:
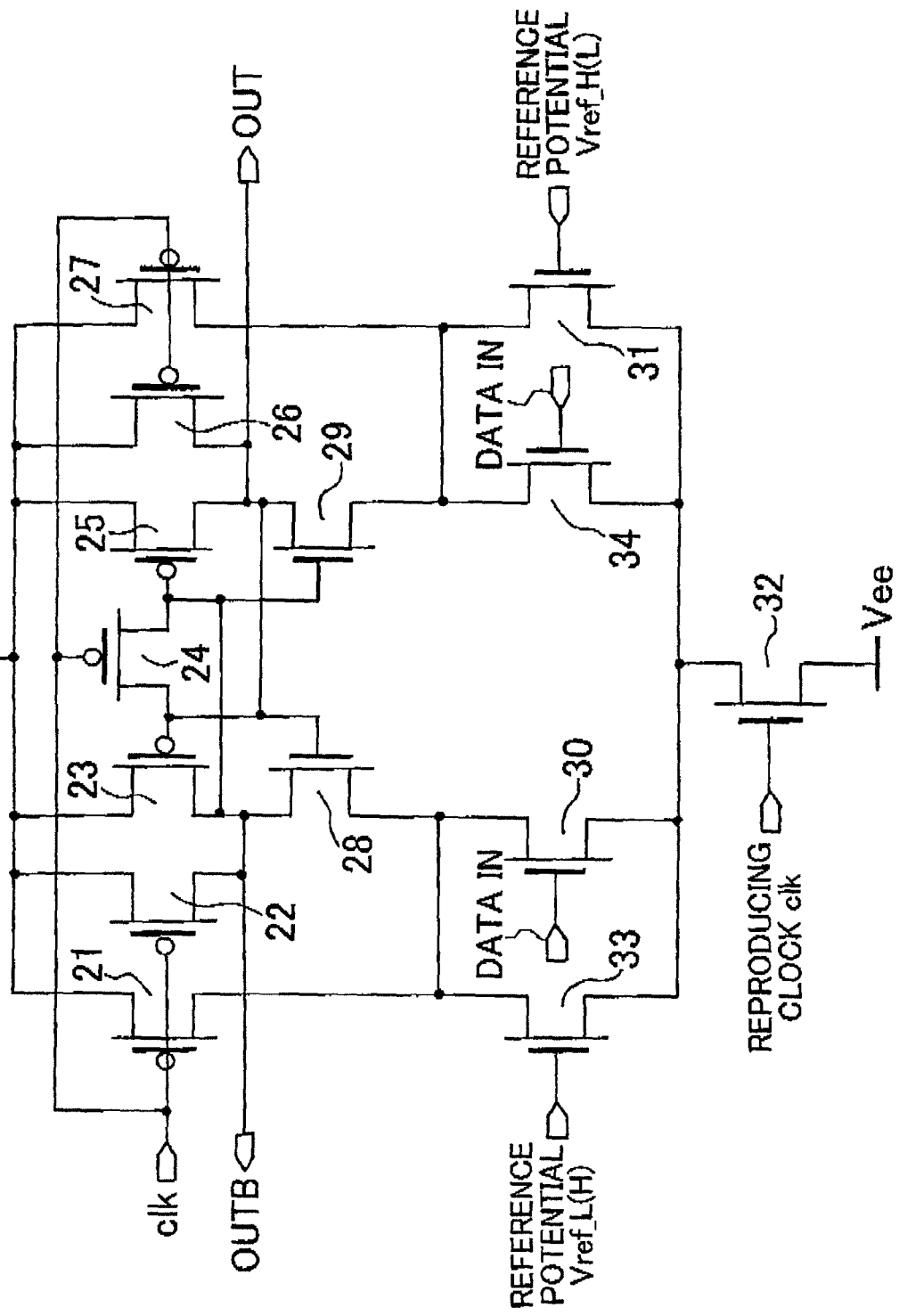
FIG. 12 is a diagram showing other configuration example of the sampling latch.

As described above, the embodiment of the present invention has been described in detail with reference to the drawings; however, specific configurations are not limited to the same embodiment. For example, the phase detection circuit 2 may be configured to determine a phase difference between the reproducing clock clk and the data of the duobinary transmission signal (IN) by using neighboring two data, a plurality of data at the front and back sides of the two data, and edge data at the boundaries of the two data. Furthermore, the sampling latches 13 and 14 shown in FIG. 4 may be the configuration shown in FIG. 12. In the sampling latch 13 shown in this drawing, nMOSs 33 and 34 are newly added with respect to the configuration shown in FIG. 5, and it is applied in the case where the duobinary transmission signal (IN) is differentially transmitted.

INDUSTRIAL APPLICABILITY

The present invention can be applied in all the cases where a clock is reproduced from a duobinary transmission signal. Furthermore, if the present invention is used for demultiplexed data in high-speed serial communication, a plurality of Up/Down signals can be outputted at one data operation time.

The invention claimed is:

1. A clock reproducing apparatus comprising:
a data detection unit which receives data of a duobinary transmission signal which has a data eye size Veye, a reproducing clock, a first reference potential and a second reference potential, detects the data of the duobinary transmission signal using the first reference potential which is for determining an intermediate data level and a maximum data level of the duobinary transmission signal and the second reference potential which is for determining the intermediate data level and a minimum data level of the duobinary transmission signal, and decodes the detected data;
a phase comparison unit which outputs a signal for advancing a phase of the reproducing clock or a signal for delaying the phase of the reproducing clock on a basis of the decoded data;
a reference clock generator which generates a reference clock; and
a phase adjustment circuit which receives the reference clock, adjusts a phase of the reference clock based on the signal for advancing the phase of the reproducing clock or the signal for delaying the phase of the reproducing clock, and outputs the adjusted reference clock as the reproducing clock,
wherein, when a potential difference between an intermediate potential indicating the intermediate data level and a maximum potential indicating the maximum data level is Veye, the first reference potential is set higher than the intermediate potential and less than Veye from the intermediate potential.

2. The clock reproducing apparatus according to claim 1, wherein, the first reference potential is set not less than Veye/√3 and not higher than Veye/√2 from the intermediate potential.

3. The clock reproducing apparatus according to claim 1, wherein, when a potential difference between the intermediate potential indicating the intermediate data level and a minimum potential indicating the minimum data level is Veye, the second reference potential is set higher than −Veye from the intermediate potential and less than the intermediate potential.

4. The clock reproducing apparatus according to claim 1, wherein the second reference potential is set not higher than −Veye/√3 and not less than −Veye/√2 from the intermediate potential.

5. The clock reproducing apparatus according to claim 1, further comprising a low pass filter which averages the output signal of the phase comparison unit, and outputs the averaged signal to the phase adjustment circuit, the adjustment by the phase adjustment circuit being carried out on a basis of the averaged signal.

6. A clock reproducing apparatus comprising:
a data detection unit which receives data of a duobinary transmission signal which has a data eye size Veye, a reproducing clock, a first reference potential and a second reference potential, detects the data of the duobinary transmission signal using the first reference potential which is for determining an intermediate data level and a maximum data level of the duobinary transmission signal and the second reference potential which is for determining the intermediate data level and a minimum data level of the duobinary transmission signal, and decodes the detected data;
a phase comparison unit which outputs a signal for advancing a phase of the reproducing clock or a signal for delaying the phase of the reproducing clock on a basis of the decoded data;
a reference clock generator which generates a reference clock; and
a phase adjustment circuit which receives the reference clock, adjusts a phase of the reference clock based on the signal for advancing the phase of the reproducing clock or the signal for delaying the phase of the reproducing clock, and outputs the adjusted reference clock as the reproducing clock,
wherein, when a potential difference between an intermediate potential indicating the intermediate data level and a minimum potential indicating the minimum data level is Veye, the second reference potential is set higher than −Veye from the intermediate potential and less than the intermediate potential.

7. A clock reproducing method comprising:
receiving data of a duobinary transmission signal which has a data eye size Veye, a reproducing clock, a first reference potential and a second reference potential,
detecting the data of the duobinary transmission signal using the first reference potential which is for determining an intermediate data level and a maximum data level of the duobinary transmission signal and the second reference potential which is for determining the intermediate data level and a minimum data level of the duobinary transmission signal;
decoding the detected data and outputting a signal for advancing a phase of the reproducing clock or a signal for delaying the phase of the reproducing clock on a basis of the decoded data;
generating a reference clock; and
adjusting a phase of the reference clock based the signal for advancing the phase of the reproducing clock or the signal for delaying the phase of the reproducing clock, and outputting the adjusted reference clock as the reproducing clock,
wherein, when a potential difference between an intermediate potential indicating the intermediate data level and a maximum potential indicating the maximum data level is Veye, the first reference potential is set higher than the intermediate potential and less than Veye from the intermediate potential.

8. The clock reproducing method according to claim 7, wherein, the first reference potential is set not less than Veye/√3 and not higher than Veye/√2 from the intermediate potential.

9. The clock reproducing method according to claim 7, wherein, when a potential difference between the intermediate potential indicating the intermediate data level and a minimum potential indicating the minimum data level is Veye, the second reference potential is set higher than −Veye from the intermediate potential and less than the intermediate potential.

10. The clock reproducing method according to claim 7, wherein the second reference potential is set not higher than −Veye/√3 and not less than −Veye/√2 from the intermediate potential.

11. The clock reproducing method according to claim 7, further comprising averaging the signal for advancing the phase of the reproducing clock or the signal for delaying the phase of the reproducing clock, and the adjustment of the phase of the reference clock is carried out on a basis of the averaged signal.

12. A clock reproducing method comprising:
- receiving data of a duobinary transmission signal which has a data eye size Veye, a reproducing clock, a first reference potential and a second reference potential,
- detecting the data of the duobinary transmission signal using the first reference potential which is for determining an intermediate data level and a maximum data level of the duobinary transmission signal and the second reference potential which is for determining the intermediate data level and a minimum data level of the duobinary transmission signal;
- decoding the detected data and outputting a signal for advancing a phase of the reproducing clock or a signal for delaying the phase of the reproducing clock on a basis of the decoded data;
- generating a reference clock; and
- adjusting a phase of the reference clock based on the signal for advancing the phase of the reproducing clock or the signal for delaying the phase of the reproducing clock, and outputting the adjusted reference clock as the reproducing clock,
- wherein, when a potential difference between an intermediate potential indicating the intermediate data level and a minimum potential indicating the minimum data level is Veye, the second reference potential is set higher than −Veye from the intermediate potential and less than the intermediate potential.

* * * * *